United States Patent
Oetzel et al.

(10) Patent No.: US 7,302,453 B2
(45) Date of Patent: Nov. 27, 2007

(54) OPTIMIZING THE RECORDING ON A REWRITABLE INTERACTIVE MEDIUM OF REVISIONS TO AN EXISTING PROJECT ON THAT MEDIUM

(75) Inventors: Kenneth G. Oetzel, Novato, CA (US); Henry Van Horik, Berkeley, CA (US)

(73) Assignee: Sonic Solutions, Novato, CA (US)

( * ) Notice: Subject to any disclaimer, the term of this patent is extended or adjusted under 35 U.S.C. 154(b) by 462 days.

(21) Appl. No.: 10/408,027

(22) Filed: Apr. 3, 2003

(65) Prior Publication Data
US 2003/0227474 A1 Dec. 11, 2003

Related U.S. Application Data

(60) Provisional application No. 60/370,046, filed on Apr. 4, 2002.

(51) Int. Cl.
*G06F 17/00* (2006.01)
(52) U.S. Cl. ........................ 707/203; 707/200
(58) Field of Classification Search ................ 707/203, 707/200; 386/4, 125
See application file for complete search history.

(56) References Cited

U.S. PATENT DOCUMENTS

| | | | |
|---|---|---|---|
| 5,029,125 A | 7/1991 | Sciupac | |
| 6,016,553 A | 1/2000 | Schneider et al. | |
| 6,023,713 A | 2/2000 | Grimsrud et al. | |
| 6,393,206 B1 | 5/2002 | Yagi et al. | |
| 6,407,745 B1* | 6/2002 | Yamada et al. | 345/593 |
| 2002/0107865 A1* | 8/2002 | Rotem et al. | 707/102 |

FOREIGN PATENT DOCUMENTS

| | | |
|---|---|---|
| WO | WO 99/38098 | 7/1999 |
| WO | WO 01/41452 | 6/2001 |

OTHER PUBLICATIONS

Myers et al "A Multi-View Intelligent Editor for Digital Video Libraries", ACM 2001, pp. 106-115.*
Roman et al "Program Visualization: The Art of Mapping Programs to Pictures", ACM 1992, pp. 412-420.*
International Search Report mailed Feb. 7, 2003.
Hughes, K., "The Tools and Twists of DVD Authoring," *Emedia Professional*, vol. 10, NR. 12, pp. 37-40, 42, 44-46, 48, 50, XP002110307, ISSN: 1090-946X, p. 42.
International Search Report mailed Dec. 19, 2002.
Hughes, K., "The Tools and Twists of DVD Authoring," *Emedia Professional*, vol. 10, NR. 12, pp. 37-40, 42, 44-46, 48, 50, XP002110307, ISSN: 1090-946X, p. 42, DEc. 1997.

* cited by examiner

*Primary Examiner*—Uyen Le
(74) *Attorney, Agent, or Firm*—Fitch, Even, Tabin & Flannery (57) ABSTRACT

An authoring file, readable by DVD-Video authoring program, defines the playback structure of the DVD-Video material residing in a given disc's "DVD-Video zone" (VIDEO_TS directory) and also defines the location of the assets that make up the disc—s DVD-Video "presentation data." The efficiency with which a DVD-Video title stored on a rewritable disc (e.g. DVD-RW, DVD+RW, DVD-RAM, or CD-RW) that has been revised in a compatible software applicaiton may be written back to that same disc is optimized. The minimum amount of file rewriting required to effect the desired revisions to the project, in particular avoiding the rewriting of large VOB files, is determined.

29 Claims, 2 Drawing Sheets

OPTIMIZING THE RECORDING ON A REWRITABLE INTERACTIVE MEDIUM OF REVISIONS TO AN EXISTING PROJECT ON THAT MEDIUM

The present application claims priority from provisional U.S. patent application Ser. No. 60/370,046, filed Apr. 4, 2002, and is related to U.S. patent application Ser. No. 10/123,816, filed Apr. 15, 2002, which claims priority from provisional U.S. patent application Ser. No. 60/286,773, filed Apr. 26, 2001, all of which are hereby incorporated by reference.

BACKGROUND OF THE INVENTION

1. Field of the Invention

This invention relates generally to the development of interactive visual media, and, more specifically, to improvements in systems used in the development ("authoring") of media content for delivery in the DVD-Video, Video CD, and similar formats.

2. Background Information

The DVD-Video format is one of a number of formats, both standardized and proprietary, within the general category of interactive multimedia. These formats are capable of presenting motion or still images to an end-user (viewer) on a display such as a television screen or a computer monitor, along with accompanying sound. The media are referred to as "interactive" because they allow the timing, order, and conditions governing presentation to vary depending on input from the end-user.

In a typical DVD-Video playback setting, user input is communicated to the playback device via either a remote control (for a set-top DVD-Video player) or a computer mouse and keyboard (for a DVD-ROM drive connected to a computer). The user responds to onscreen prompts or menus (lists of possible options) by pressing keys or clicking the mouse. The playback path through the material available to be played is altered according to the choices or "navigation" of the user.

When presenting DVD-Video program material, a DVD playback device works with two basic categories of data to create the experience of the end-user, presentation data and logical data. Presentation data is the data that is actually seen or heard: the video, audio, graphics and text. The basic unit of presentation data in DVD is a Video Object (VOB), stored in a VOB file. Logical data is information about the order and conditions under which presentation data is presented. Logical data defines the way the content is organized, and also the way in which user input will affect the navigational flow through the presentation data. The basic unit of logical data in DVD is the Program Chain (PGC), defined in an IFO file. The presentation data seen (and heard) by the end-user results from the player following the instructions of the logical data (as well as user input from the remote control). Together, the presentation data and logical data for a given selection on the disc (i.e. a feature film, short film, or music video, as well as associated menus) are stored on the DVD in a set of files referred to as a Video Title Set (VTS). The VOBs used in each VTS are collectively contained in that VTS's Video Object Set (VOBS). The details of the various aspects of the DVD storage means and protocol are described more fully in "DVD specification for Read-Only Disc, Physical, File Format and Video Specifications", DVD Consortium, 1997, which is hereby incorporated by reference in its entirety.

The process of creating interactive multimedia is generally referred to as "authoring." Authoring is usually accomplished using one or more software applications running on a computer. In DVD-Video authoring, a disc or collection of discs that are created to be a single unit is commonly referred to as a "DVD title." The authoring work in progress on a given title is commonly referred to as a "project."

The heart of authoring is the defining of the logical data used to structure the playback of presentation data, such as defining the "user interface" (e.g. menus) used to navigate the program, the choices offered to users during playback, and the response of the playback device to user input. During this process, the project's presentation data is normally stored on a hard-drive where it is accessible—locally or via a network—to the authoring system. This allows the author to review the effects of authoring decisions on the way in which the program material is presented.

During the process of defining a project's logical data, the presentation data to which the logical data refers may be in any file format supported by the authoring software, and may be stored at any accessible location. In a project using multiple video clips, for instance, the source file for one clip might be an AVI file stored on the authoring system's internal hard-drive, for another it might be an MPEG-2 file on an external hard-drive, and for a third it might be a QuickTime file accessed from a server over a network.

Each authoring program has its own method of keeping track of the location and format of the presentation files used in a given project, and also keeping track of the logical data decisions that are made during authoring. One such approach is AuthorScript, developed by Sonic Solutions and used in several of its authoring programs. Other approaches are described, for example, in International Patent Application WO 99/38098, published Jul. 29, 1999, and U.S. Pat. No. 6,023,713, both of which are hereby incorporated by reference. In the AuthorScript approach, an AuthorScript (.AS) file is created by the authoring program to store both "structure" information related to a project's logical data, and "asset" information about a project's presentation data. Further aspects relating to the production of interactive optical media are described, for example, in International Patent Application WO 96/15500, May 23, 1996, which is hereby incorporated by reference.

When an existing project is "opened" in an AuthorScript-based authoring program, the AS file is read and the asset information in it is used to locate the source files of the presentation data. The structure data, meanwhile, is used to restore the project's logical state. As the project is edited, changes are stored in the .AS file, making an up-to-date record of the author's progress on the project.

At the end of the authoring process, when all the decisions regarding logical data are finalized, the project is formatted for delivery on a DVD. The formatting software reads the .AS file, evaluates the information therein, and carries out a series of operations that convert the project's current state into a form that is playable from a DVD-Video playback device.

In terms of presentation data, the process first involves locating the various source files referenced in the .AS file and, where necessary, converting those files to "elemental streams," which are files in the formats used by DVD-Video for the various types of presentation media (e.g. video source files that are not already in the MPEG-2 video format are converted to that format). This may involve "transcoding" of one or more video files (e.g. a complete feature film) from one format to another. In some cases, it may also involve "compositing" several distinct components found in separate files into a unified whole. Compositing is particularly common in the case of menus, which often involve a number of visual elements that reside in different files during the authoring process.

Once the elemental streams exist in the appropriate file formats for use in DVD, they can then be multiplexed together into the Video Object (.VOB) files that are used by a DVD playback device. The logical data created in authoring is also organized into a set of files (.IFO) that can be read and interpreted by a playback device designed to play back discs in the DVD-Video format. Then a "disc image" is written that embodies the entire directory structure and data files that will appear on the final disc, with the logical and presentation files all residing in a VIDEO_TS directory (the "DVD-Video zone"), from which they can be read by a DVD-Video playback device.

A disc image is the source for all the DVDs that are made of a given title, whether replicated in a DVD plant or recorded onto a recordable DVD medium. However, the disc image itself cannot be opened as a project in a DVD-Video authoring program. A DVD-Video disc, therefore, is not functionally equivalent to the project from which it was made. However, AuthorScript incorporates a set of "OpenDVD" functionalities that allow revisions to a DVD title to be accomplished entirley with materials stored on the DVD itself, as is described in commonly assigned U.S. patent application Ser. No. 10/123,816, filed Apr. 15, 2002, which is hereby incorporated by this reference. This means that the files (the .AS file and the source assets) originally used to create a disc image need not be available when revising the title. Once a DVD title has been revised, the project may be written back to the disc. However, due to the size of VOB files, a simple transfer of all the material to the hard-drive of the system running the authoring software and then back to the rewritable disc requires significant space on the hard-drive and is generally very time-consuming.

SUMMARY OF THE INVENTION

Embodiments of the present invention relate to improvements in the utilization of an "AuthorScript" or other authoring file readable by a DVD-Video authoring program, that defines the playback structure of the DVD-Video material residing in a given disc's "DVD-Video zone" (VIDEO_TS directory) and also defines the location of the assets that make up the disc's DVD-Video "presentation data." Specifically, embodiments of the invention presents a method of optimizing the efficiency with which a DVD-Video title stored on a rewritable disc (e.g. DVD-RW, DVD+RW, DVD-RAM, or CD-RW) that has been revised in an AuthorScript—enabled software application may be written back to that same disc. (Efficiency is defined as accomplishing the rewriting in the shortest possible time.) One method determines the minimum amount of file rewriting required to effect the desired revisions to the project, in particular avoiding the rewriting of large VOB files.

In an exemplary embodiment, the media image of a project is opened, copied to, and edited on a workstation or other such consumer device. The project may be edited using only the content from the media image stored on the medium or may also include newly added material. After the user finishes the editing process and wants to write the project back to the media, a comparison is made between the edited and original versions of the project. Based on the comparison, the media image of the opened project is then revised as needed and written back to the interactive media. The comparison determines those portions of the project that have not changed and preserves them on the interactive media so that they do not need to be rewritten. The sectors of the media image corresponding to these unchanged portions are reserved, with the remaining unreserved sectors being matched with the portions that differ from the opened version using a bin-packing algorithm.

Additional details, features and advantages of the present invention will become apparent from the following description, which should be taken in conjunction with the accompanying drawings.

DESCRIPTION OF REPRESENTATIVE EMBODIMENTS

As is described in above, U.S. patent application Ser. No. 10/123,816, filed Apr. 15, 2002, which was incorporated by reference above, allows an "edit on disc" process where revisions to a DVD title to be accomplished entirely with materials stored on the DVD itself. This means that the files (the authoring file, such as an .AS file, and the source assets) originally used to create a disc image need not be available when revising the title. The ability to open a DVD project directly from the DVD title created from that project is valuable in both professional and consumer applications of DVD technology. In professional production, a single "editable disc" with this capability can serve as a convenient archive not only of the title, but also of the project and it's component parts. Publishers of DVD "clip media" can offer products containing media that is at once easily previewable in a DVD-Video player and also easily incorporated into different projects authored with compatible authoring systems. Editors preparing video content for a DVD project can output their work to a DVD-Video compliant DVD-R, say, for evaluation and approval, then hand off the disc to DVD authoring specialists who use it as a starting point for authoring with compatible (e.g. AuthorScript-based) authoring software.

In the consumer arena, an editable DVD allows recordable and rewritable DVD or CD media to be used for the incremental addition of DVD-Video content to an existing disc without having to retain all the source materials—particularly large video files—originally used to create the disc. A single disc can be used to create an album of content, such as a series of episodic television programs or a series of Little League games, that is added over time.

One way to create an editable DVD of a given project would be to place the project's authoring file or authoring index data (such as the .AS file in the AuthorScript approach), along with all the source files referenced by that authoring file, on the DVD in what is often referred to as the "DVD Others zone," meaning outside of the VIDEO_TS directory. However, this would mean that all the presentation data on the disc, which accounts for the vast majority of data involved in any DVD project, would be stored on disc twice. In the case of most titles, there is not enough data-storage capacity on the DVD to store redundant versions of all the presentation data files.

Patent application Ser. No. 10/123,816 uses a different approach, one that does not require that all the source files used in the project be stored redundantly on the disc. The process involves operations performed during the formatting process of the authoring software. These operations are performed in addition to all the formatting steps that are normally undertaken to convert a project into a disc image. These operations may be accomplished using established computer programming techniques and, for specificity, are described with respect to an AuthorScript-based DVD-Video embodiment when reference is made to a specific embodiment:

- The formatting software evaluates each Program Chain (PGC) defined in the project (e.g., .AS) file, determining which PGCs contain assets that will undergo compositing during formatting.
- The source assets referenced by PGCs that use composited streams are included in the disc image, outside the VIDEO_TS directory, in their discrete, pre-composited state.
- A authoring file or authoring index data is then generated, in which the locations of referenced assets used during authoring are replaced by new locations within the disc image:
  - For assets that are not composited, the new locations referenced will be within the VIDEO_TS directory of the disc image.
  - For assets that are composited, the new locations referenced will be within the disc image, but outside the VIDEO_TS directory.

The newly generated authoring file or authoring index data will also be included in the disc image, outside the VIDEO_TS directory.

A DVD created using the steps above will be editable by compatible authoring software (AuthorScript-based DVD authoring software in the exemplary embodiment), as long as the software has the ability to recognize assets in the VIDEO_TS directory of a DVD. With the disc in a DVD drive in an authoring workstation other suitable consumer device with authoring capability, the authoring program will read the asset reference section of the .AS file on the disc, thereby gaining access to all the source assets used to create the disc, including the pre-composited elements that make up menus and other composited parts of the title. Only these pre-composited elements—usually a small portion of the overall presentation data—will be stored redundantly to the presentation data already stored within the VIDEO_TS directory. The authoring program will also have access to the title's logical data, stored in an compatible form in the structure section of the .AS file. At that point the recreated project will be editable just as it was at the time the title was formatted and the disc image created.

Such an editable DVD disc may be prerecorded (replicated at a plant), or it may be recorded on recordable or rewritable media. If the media is rewritable (e.g. DVD-RW, DVD+RW, DVD-RAM, or CD-RW), the revised version that is the result of the editing process may be rewritten back to the same disc that contains the project that was edited. However, due to the size of VOB files, a simple transfer of all the material to the hard-drive of the system running the enabled authoring software and then back to the rewritable disc requires significant space on the hard-drive, and is generally very time-consuming. A more efficient approach would involve a method for determining the minimal amount of file rewriting required to effect the desired revisions to the project, in particular avoiding the rewriting of large VOB files. Although the following discussion is presented primarily in the context an editable disc as the starting point, it can also applied to other writable interactive media already containing material that is to form part of a project to be edited and written back to the media. Examples of such optical disc formats include DVD-Video, Video CD, and similar current formats, along with HD-DVD and related future formats, while examples of non-optical disc media include electronic memories such as magnetic hard disc, semiconductor memory cards, and others.

A principle aspect of embodiments of the present invention provides such techniques for reducing the amount of rewriting. More specifically, when a project is opened from a disc on a workstation (or other consumer device), the project file is copied onto the device's memory. The project can then be edited, using both content from the disc as well as new material, in a manner such as that described in U.S. patent application Ser. No. 10/123,816. Once the user is finished editing and decides to write the project back to the media, rather than forming a disc image of the entire edited project and writing it back in its entirety, a differential comparsion is performed between the project as opened and the project after it has been edited. Based on this, the process determines which portions of the project need to be written back to the media and how. For example, if a file from the original disc image has not been changed, it can be preserved on the media, thereby avoiding having to rewrite it. Although is some instances, the process may result in everything in the project being rewritten of (if, say, only new material is added) all of the original material is maintained, typically, portions of the project will need to rewritten.

More specifically, the exemplary embodiment begins by determining which Video Objects can be preserved in place on the rewritable media. For assets in the revised project that will not undergo composting, it is determined whether the corresponding VOBs are already on the media and, if so, whether there was any change to the assets' start or end points. The process then builds a data structure according to these possibilities, determining which parts of the disc image to preserve and which parts can be overwritten. Space is then allocated for revised disc, with the space for the preserved files being reserved and the remaining "holes" being matched to the files needing to be written by use of a bin-packing algorithm. Based on this allocation, the files to be written to the media are then written.

An exemplary embodiment of the methods of the present invention involves the steps outlined below and can be enabled using standard computer programming techniques. Although the discussion is based on using an optical disc as the medium, it extends to other interactive media. The discussion is also based on an AuthorScript embodiment, although other authoring programs can be used. Note that the following description of the method assumes that in a DVD title created by AuthorScript, each Video Title Set (VTS) is allowed only a single Program Chain (PGC), and the Video Object Set (VOBS) referenced by the Programs within that PGC might contain only a single VOB file, although these assumptions may all be generalized.

The method involves new operations added to the formatting process of authoring software. These operations are performed in addition to the formatting steps, outlined in Background of the Invention above, normally undertaken to convert a project into a disc image. These operations may be accomplished using established computer programming techniques.

It is well known is the art that logic or digital systems and/or methods can include a wide variety of different components and different functions in a modular fashion. The following will be apparent to those of skill in the art from the teachings provided herein. Different embodiments of the present invention can include different combinations of elements and/or functions. Different embodiments of the present invention can include actions or steps performed in a different order than described in any specific example herein. Different embodiments of the present invention can include groupings of parts or components into larger parts or components different than described in any specific example herein. For purpose of clarity, embodiments of the invention are described in terms of systems that include many different innovative components and innovative combinations of innovative components and known components. No inference should be taken to limit the invention to combinations containing all of the innovative components listed in any illustrative embodiment in this specification. The functional aspects of embodiments of the invention, as will be understood from the teachings herein, may be implemented or accomplished using any appropriate implementation environment or programming language, such as C++, JavaScript, etc.

Figure 1:
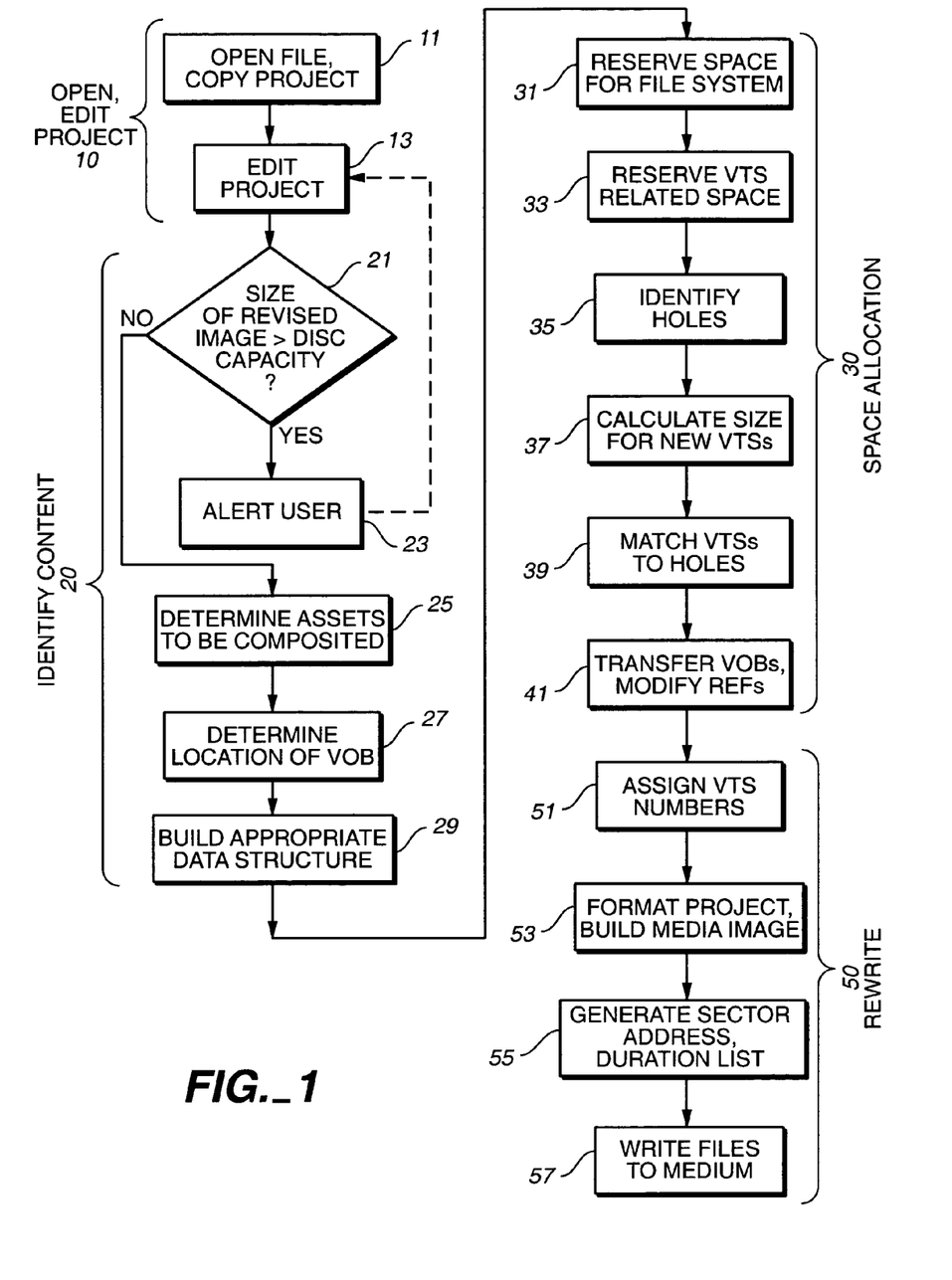
FIG. 1 is a flowchart of an exemplary embodiment of the method.
Figure 2:
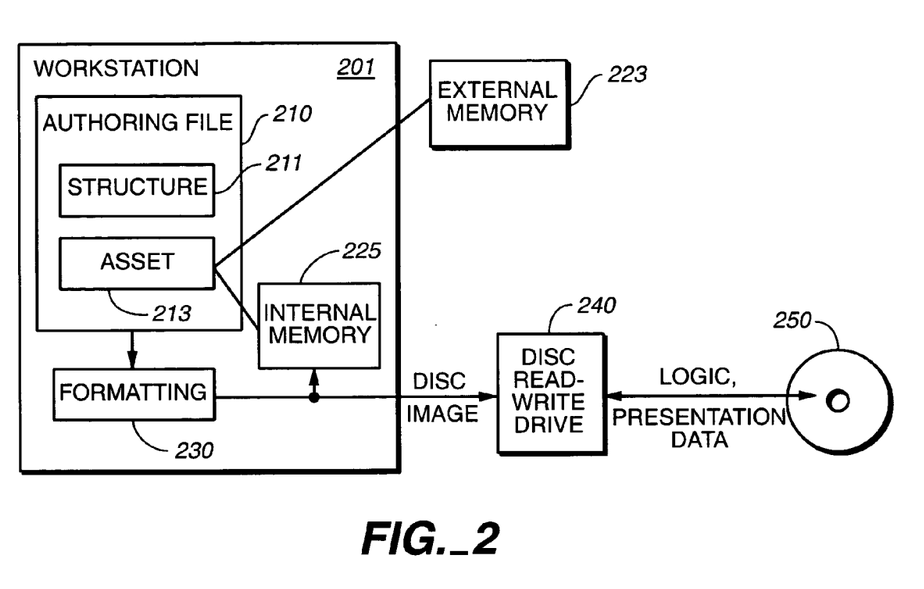
FIG. 2 is a box diagram of the elements used in the process of FIG. 1.

More specifically, FIG. 1 presents the exemplary embodiment in terms a flow chart and FIG. 2 is a block diagram representing the various elements of this process. The workstation (or other suitable consumer device) 201 used for the authoring process contains compatible software. When a user is working on the project, the authoring file 210 will have the project's structure information 211 and asset information 213. The source files can either be stored on the workstation's internal memory (hard drive or RAM) 225 of at external source 223. When the editing process is finished, the Video Object files are formed at formatting 230 and the disc image, containing the logical and presentation data, is supplied to the media read-write drive 240 and placed onto the disc 250. According to a principal aspect of embodiment of the present invention, the project can originate from the content of the medium 250 itself, being read from the media by the drive 240 and placed in memory 225. The editing can then be performed based solely on the content originating on the media as well as additional material from external memory 223 or internal memory 225. In another principal aspect of embodiments of the present invention, when the edited project is ready to placed back on to the media, a differential comparison is made between the current form of the project and its form as opened prior to editing in order to more efficiently execute the writing back of the edited project. For example, portions of the original content may be unchanged and their rewriting can be avoided.

Returning to FIG. 1, an exemplary embodiment is described. This begins with opening of the project from the media, such as that described in U.S. patent application Ser. No. 10/123,816, filed Apr. 15, 2002, which was incorporated by reference above.

The first phase 10 begins with opening the DVD (or other media) title on the existing rewritable media as a project. When the rewritable disc to be edited is in the host computer's rewritable drive (240, FIG. 2), and the software application (210, AuthorScript-enabled in this example) is running, the end-user initiates the editing mode (generally by selecting an "Edit Disc"-type of option from a menu) in step 11. This causes the project (.AS) file on the rewritable disc to be copied into the computer's memory (in RAM or on a hard-drive, 225 of FIG. 2). (In the exemplary embodiment, the entire script is copied at this point, although alternate embodiments may only transfer particular portions as they are needed.) Using the AuthorScript-enabled software application, in step 13 the end-user edits (makes changes to) the project file in memory. The changes may involve deleting or adding one or more video or still movie, adding or deleting menus, adding or deleting menu items (buttons) on a menu, changing the audio track(s) associated with a movie, "trimming" the start or end points in a video movie, etc. These changes do not affect any of the data stored on the rewritable disc.

The next phase 20 of the process identifies the media content, video objects (VOBs) for the DVD example, on the rewritable media can be preserved in place. When the user indicates readiness to make a DVD incorporating the revisions made to the project, the total size of the revised disc image is estimated in step 21. If the size exceeds the capacity of the rewritable disc, the process is aborted and the user is alerted (step 23), in which case the user can then decide to edit the project some more in order to reduce its size or take other steps. At step 25, the formatting engine then looks at the program chain (PGC) in each video title set (VTS) defined in the edited project file, determining which PGCs do not refer to assets that will undergo compositing during formatting. (As described in above, if a PGC's assets are to be composited during formatting, the exemplary embodiment includes those assets in the disc image, outside the VIDEO_TS directory, in their discrete, pre-composited state.)

If the PGC in a given title set does not refer to assets that will undergo compositing during formatting, authoring software determines the location of the VOB referenced by the PGC in step 27. For any given PGC, there are three possibilities:
  1) The VOB file is located on the rewritable disc.
  2) The VOB file is located on the rewritable disc, but the addresses of the video cells referenced in the PGC do not match the addresses of the cells in the asset on the rewritable disc because the asset was trimmed (start and/or end points changed) during editing.
  3) The VOB file is not located on the rewritable disc (the asset has been added to the project during editing).

In step 29, the authoring engine builds a data structure in memory that defines each VTS in the revised project as belonging to one of three categories:
  1) The title set's PGC corresponds to possibility 1 above. Because the VTS's VOB file already exists on the rewritable disc, the file can be preserved when the disc is revised.
  2) The VTS's PGC corresponds to possibility 2 above. Depending on the nature of the trimming done during editing, the VTS's VOB file may or may not be preserved. The various possibilities and how these are treated are described in more detail below.
  3) The VTS's PGC corresponds to possibility 3 above. The VTS's VOB file will not be preserved, and therefore the space it occupies on the rewritable disc may be overwritten.

The next phase 30 allocates space in a layout of the revised disc. In step 31 the authoring engine reserves space for rewriting the file system. In the exemplary embodiment, this is a number of sectors defined by the DVD specification at start of the disc for rewriting of the UDF/9660 file system. Step 33 reserves space for each title set containing a VOB that is to be preserved. In the exemplary embodiment, a number of sectors immediately preceding the VTS's VOB file are reserved for rewriting the control data (VTSI) and Menu data (VTSM_VOBS), and a number of sectors immediately following the VOB file are reserved for rewriting the VTSI backup (.BUP file). The number of sectors to reserve for each type of data is extrapolated from the size of the existing data and can be defined in a lookup table.

Following step 33, there will be typically be a number of "holes" or contiguous sectors that are not reserved for the file structure or for VTSs with VOBs that are to be preserved. In step 35, the holes on the rewritable medium are identified and cataloged in a data structure containing the disc address (starting sector) and size (number of sectors) of each hole. The size is calculated for each new VTS (a VTS not containing a VOB that will be preserved) in step 37.

Once the holes are determined and the size for the new VTSs determined, they are matched in step 39 using a "bin packing" algorithm. If bin packing is not successful, one or more VOB that was to have been preserved will instead be designated for transfer to the hard-drive, and the corresponding VTS will be treated as if it were a new VTS. The VOB or VOBs that will no longer be designated as preserved will be chosen such that the total amount of data still preserved is as great as it can be while allowing bin packing to succeed. Once bin packing is completed successfully, in step 41 the VOBs designated for transfer back to the hard drive (if any) are transferred, and the references to those VOBs (in the PGCs of the corresponding VTSs in the edited project file) are modified accordingly and the revised media image can be built and written in phase 50.

Step 51 assigns sequential VTS numbers to the video title sets defined in the revised project. The authoring engine formats the project (230, FIG. 2) and builds the disc image for the revised disc in step 53. Control, composited menu, and backup data for any preserved VTS is regenerated from the corresponding data on the rewritable disc. All data for a new VTS is derived from data on the computer hard-drive (225). The authoring engine generates a list (step 55) showing the sector address and duration of:

files to preserve files to be written unutilized holes (sectors that are not needed for newly written data).

The list is consulted during the writing of the disc (step 59). At the conclusion of writing each file that is to be written, the drive 240 (FIG. 2) seeks to the address of the next file to be written, skipping over any intervening preserved files and/or unutilized holes (the data in the holes does not need to be erased because it is no longer referenced in the disc's file system). This process continues until writing of the disc is complete.

The process described with respect to FIG. 1 provides a general overview of the steps in the method. However, as noted in step 37 above, if a VTS's VOB is trimmed during editing, the method may or may not preserve the corresponding VOB file on the rewritable medium, depending on the nature of the trimming performed. The determination of how the VOB will be handled depends on the specific situation, as described in the following six cases for the DVD embodiment.

In case 1, the editing results only in a new end time for VOB playback, and the new end time corresponds with an existing boundary between cells defined in the VOB:

Any Programs in the PGC will no longer reference the unused cells at the end of the VOB.

If the space occupied by those unused cells on the rewritable disc is needed in order to fit new VTSs onto the rewritable disc, then the sectors on the rewritable disc that are occupied by the no-longer-needed cells in the VOB may be reclaimed by including them on the list of holes (see step 35 of FIG. 1 above).

In case 2, the editing results only in a new end time for VOB playback, but the new end time does not correspond with an existing boundary between cells defined in the VOB:

The sectors on the rewritable disc that are occupied by the no-longer-needed portion of the VOB may be reclaimed by moving the cell boundary using a process referred to as "rippling." In rippling, the cell identification number is rewritten in all Navigation Packs (NV_PCK) in the two cells affected by the moving of the boundary. The number of Navigation Packs that need to be rewritten (and thus the time required for rippling) may be minimized by defining the maximum number of cells (up to 255) in a VOB when it is initially created by the AuthorScript formatting engine, thereby lessening the interval between cell boundaries.

The cell boundary will only be moved if the software estimates that the time required for rippling will be less than the time required to treat the corresponding VTS as new (transfer the VOB to the hard-drive, then transfer an edited version back to the rewritable disc as part of the new VTS).

After rippling, the sectors on the rewritable disc that are occupied by the cells following the revised cell boundary may (if needed) be reclaimed by including them on the list of holes in step 35 above.

In case 3, the editing results in a new start time that is offset from the start of the existing VOB, the new start time corresponds with an existing boundary between cells defined in the VOB, and the space occupied by those unused cells on the rewritable disc is not needed in order to fit new VTSs onto the rewritable disc:

The unused cells at the beginning of the VOB will no longer be referenced by any Programs in the PGC, and the existing VOB can be preserved as is.

In case 4, the editing results in a new start time that is offset from the start of the existing VOB and the new start time corresponds with an existing boundary between cells defined in the VOB, but the space occupied by those unused cells on the rewritable disc is needed to fit new VTSs onto the rewritable disc:

The unused cells at the beginning of the VOB will no longer be referenced by any Programs in the PGC.

Every Navigation Pack includes a Logical Block Number (LBN) relative to the start of the VOBS. Reclaiming the sectors occupied by cells preceding the new start time would mean changing the sector at which the VOB starts, which would render the existing LBNs invalid. Therefore, in order for the unused sectors to be reclaimed, the LBNs in the cells following the new start time must be revised, either by rewriting every Navigation Pack or rewriting the LBN within each Navigation Pack.

The revision of LBNs will only be performed if the software application estimates that the time required will be less than the time required to treat the corresponding VTS as new.

If the revision of LBNs is performed, the VOB on the rewritable disc will be preserved, and the sectors on the rewritable disc that are occupied by the cells preceding the revised start of the VOB may be reclaimed by including them on the list of holes in step 35 above.

In case 5, the editing results in a new start time that is offset from the start of the existing VOB, the new start time does not correspond with an existing boundary between cells defined in the VOB, and the space trimmed from the VOB is not needed to fit new VTSs onto the rewritable disc:

The cell boundary may be moved with rippling if the software estimates the time required for rippling to be less than the time required to treat the corresponding VTS as new.

Because the sectors on the rewritable disc that are occupied by the cells preceding the revised cell boundary do not need to be overwritten, the VOB starts at the same sector and therefore the LBN numbers are not changed.

In case 6, the editing results in a new start time that is offset from the start of the existing VOB, the new start time does not correspond with an existing boundary between cells defined in the VOB, and the space trimmed from the VOB is needed to fit new VTSs onto the rewritable disc:

The cell boundary may be moved with rippling if the time required is estimated by the software to be less than the time required to treat the corresponding VTS as new.

In order for the sectors containing cells preceding the start time to be reclaimed, the LBNs in the cells following the new start time will need to be revised, either by rewriting every Navigation Pack or rewriting the LBN within each Navigation Pack. The revision of LBNs will only be performed if the software application estimates that the time required will be less than the time required to treat the corresponding VTS as new.

If the revision of LBNs is performed, the VOB on the rewritable disc will be preserved, and the sectors on the rewritable disc that are occupied by the cells preceding the revised start of the VOB may be reclaimed by including them on the list of holes (see III-C above).

Using the method described above, a DVD on a rewritable disc (e.g. DVD-RW, DVD+RW, DVD-RAM, or CD-RW) that is revised using compatible (AuthorScript-enabled in the example) software application may be written back to that rewritable disc more quickly than if the entire contents of the rewritable disc are initially transferred to a computer hard-drive and the revised version of the DVD is subsequently transferred in its entirety back to the rewritable disc.

Figure 3:
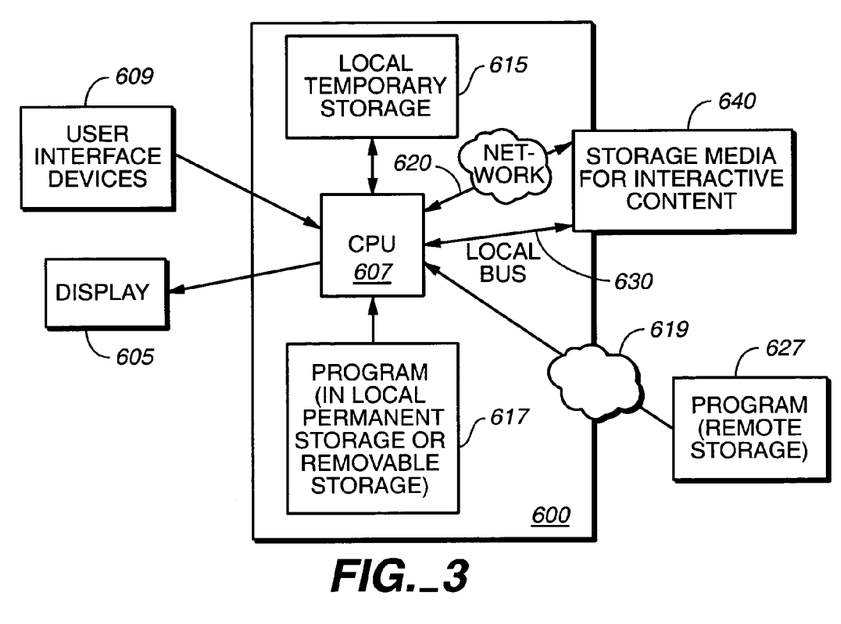
FIG. 3 is a box diagram showing an embodiment of the invention implemented in hardware and/or software.

As shown in FIG. 3, embodiments of the invention can be implemented in hardware and/or software. In some embodiments of the invention, different aspects of the invention can be implemented in either client-side logic or a server-side logic. As will be understood in the art, embodiments of the invention or components thereof may be embodied in a fixed media program component containing logic instruction and/or data that when loaded into an appropriately configured computing device cause that device to perform according to embodiments of the invention. As will be understood in the art, a fixed media program may be delivered to a user on a fixed media for loading in a user accesses through a communication medium in order to download a program component.

FIG. 3 shows an information appliance (or digital device) that may be understood as a logical apparatus that can read instructions from local storage 617 and/or remote storage 627 through a network connection 619. Apparatus 600 can thereafter use those instructions to direct server or client logic, as understood in the art, to embody aspects of the invention. One type of logical apparatus according to one embodiment of the invention is a computer system or consumer electronics devices 600 as illustrated in the block form in FIG. 6, containing elements such as CPU 607, input devices (such as a keyboard or mouse) 609, memory or disk drives 615, and display or speakers 605. Data storage media 615 and 617 may be used to program such a system and may represent a disc-type optical or magnetic media, magnetic tape, solid state memory, etc. Embodiments of the invention may be implemented in whole or in part as software recorded on this storage media. Communication port 619 may also be used to initially receive instruction that are used to program such a system and may represent any type of communication connection. Disc images, uncomposited assets, authoring project files, and other data are read from or written to storage media 640 by means of local bus 430 or remote data port 440 or other data input/output mechanisms.

Embodiments of the invention also may be implemented in whole or in part within the circuitry of an appliance specific integrated circuit (ASIC) or a programmable logic device (PLD). In such a case, embodiments may include a computer understandable descriptor language which may be used to create an ASIC or PLD that operates as herein described.

Although the various aspects of the present invention have been described with respect to specific exemplary embodiments, it will be understood that the invention is entitled to protection within the full scope of the appended claims.

The invention claimed is:

1. A method, comprising:
    copying original media data from an interactive medium to a memory of a device to create copied media data, wherein the original media data is stored as an image on the interactive medium and wherein the image is a single file comprised of presentation data and logical data;
    editing the copied media data to create edited media data;
    performing a comparison of the edited media data with the original media data; and
    selectively writing at least a portion of the edited media data to the interactive medium based upon the comparison.

2. The method of claim 1, wherein said performing a comparison comprises identifying a second portion of the edited media data that is unchanged from a corresponding portion of the original media data and wherein said writing preserves the corresponding portion of the original media data on the interactive medium.

3. The method of claim 2, wherein said writing the first portion of the edited media data comprises reserving sectors of the image corresponding to the corresponding portion of the original media data.

4. The method of claim 3, wherein said performing a comparison comprises identifying the first portion of the edited media data that differs from the original media data, and wherein said writing comprises matching the first portion with a plurality of unreserved sectors.

5. The method of claim 4, wherein said matching is performed using a bin-packing algorithm.

6. The method of claim 1, wherein said editing utilizes only content contained within the original media data.

7. The method of claim 1, wherein said editing comprises adding content not contained in the original media data.

8. The method of claim 1, wherein the interactive medium is an optical disc format.

9. The method of claim 8, wherein the image conforms to the Video CD protocol.

10. The method of claim 8, wherein the image conforms to the Super Video CD protocol.

11. The method of claim 8, wherein the image conforms to the Super Video CD protocol.

12. The method of claim 8, wherein the image conforms to the DVD-Audio protocol.

13. The method of claim 8, wherein the image conforms to an HD DVD protocol.

14. The method of claim 1, wherein the interactive medium is an electronic memory format.

15. A method, comprising:
- providing a first version of an interactive media project on a device;
- providing a second version of the interactive media project on an interactive medium;
- determining portions of the first version that are contained in the second version; and
- writing the first version to the interactive medium, wherein said portions contained in the second version are maintained during the writing.

16. The method of claim 15, wherein said providing a first version comprises:
- opening in the device the second version from the interactive medium; and
- editing the second version on the device.

17. The method of claim 15, wherein the second version corresponds to a media image, and wherein said writing comprises reserving sectors of the media image corresponding to said portions of the first version that are contained in the second version.

18. The method of claim 17, further comprising identifying portions of the first version that are not contained in the second version and matching said portions of the first version that are not contained in the second version with unreserved sectors of the media image.

19. The method of claim 18, wherein said matching is performed using a bin-packing algorithm.

20. A computer program product implemented on a computer readable medium containing instructions executed by a computer to operate in accordance with a process for forming an interactive media content compatible with a media protocol, the process comprising:
- copying original media from an interactive medium to a memory of a device to create copied media data, wherein the original media data is stored as an image on the interactive medium and wherein the image is a single file comprised of presentation data and logical data;
- editing the copied media data to create edited media data;
- performing a comparison of the edited media data with the original media data; and
- selectively writing at least a portion of he edited media data to the interactive medium based upon the comparison.

21. The product of claim 20, wherein said performing a comparison comprises identifying a second portion of the edited media data that is unchanged from a corresponding portion of the original media data, and wherein said writing preserves the corresponding portion of the original media data.

22. The product of claim 21, wherein said writing the first portion of the edited media data comprises reserving sectors of the image corresponding to the corresponding portion of the original media data.

23. The product of claim 22, wherein said performing a comparison comprises identifying the first portion of the edited media data that differs from the original media data, and wherein said writing comprises matching the first portion with a plurality of unreserved sectors.

24. The product of claim 23, wherein said matching is performed using a bin-packing algorithm.

25. The product of claim 20, wherein the media protocol is the DVD-Video protocol.

26. The product of claim 20, wherein the media protocol is the Video CD protocol.

27. The product of claim 20, wherein the media protocol is the Super Video CD protocol.

28. The product of claim 20, wherein the media protocol is the DVD-Audio protocol.

29. The product of claim 20, wherein the media protocol is an HD DVD protocol.

* * * * *

UNITED STATES PATENT AND TRADEMARK OFFICE
CERTIFICATE OF CORRECTION

PATENT NO. : 7,302,453 B2
APPLICATION NO. : 10/408027
DATED : November 27, 2007
INVENTOR(S) : Oetzel et al.

It is certified that error appears in the above-identified patent and that said Letters Patent is hereby corrected as shown below:

On the FACE PAGE:
ABSTRACT, line 1, after "by" insert --a--.
ABSTRACT, line 5, delete "disc-s" and insert --disc's--.
ABSTRACT, line 9, delete "applicaiton" and insert --application--.

In the CLAIMS:
Claim 11, column 12, line 67, delete "Super Video CD" and insert --DVD--.
Claim 20, column 13, line 39, after "media" insert --data--.
Claim 20, column 14, line 8, delete "he" and insert --the--.
Claim 21, column 14, line 16, delete "data." and insert --data on the interactive medium.--

Signed and Sealed this

First Day of July, 2008

JON W. DUDAS
*Director of the United States Patent and Trademark Office*